United States Patent
Sollenberger et al.

(10) Patent No.: US 10,538,022 B1
(45) Date of Patent: Jan. 21, 2020

(54) POLYMER INJECTION-MOLDING MOLD AND RELATED METHODS

(71) Applicant: Peak 3, LLC, Wooster, OH (US)

(72) Inventors: Edward D. Sollenberger, Wooster, OH (US); Charles R. Hill, Columbia, SC (US); Walter Wilsford, Shreve, OH (US)

(73) Assignee: Peak 3, LLC, Wooster, OH (US)

( * ) Notice: Subject to any disclaimer, the term of this patent is extended or adjusted under 35 U.S.C. 154(b) by 0 days.

(21) Appl. No.: 16/176,847

(22) Filed: Oct. 31, 2018

(51) Int. Cl.
  *B29C 45/73* (2006.01)
  *B29C 45/78* (2006.01)
  *B29C 45/00* (2006.01)

(52) U.S. Cl.
  CPC .......... *B29C 45/73* (2013.01); *B29C 45/0001* (2013.01); *B29C 45/0046* (2013.01); *B29C 45/78* (2013.01)

(58) Field of Classification Search
  None
  See application file for complete search history.

(56) References Cited

PUBLICATIONS

Screen captures from ISOCOS webpage; 7 pages; Retrieved from the Internet: <https://isocos.com/en/index.php>, accessed Feb. 2019.

(Continued)

*Primary Examiner* — Monica A Huson
(74) *Attorney, Agent, or Firm* — Black, McCuskey, Souers & Arbaugh LPA

(57) ABSTRACT

A polymer injection-molding mold having a polymer injection-molding mold having a core insert and a cavity insert; at least two rear-wall glass-filled polyimide insulation plates, one of the rear-wall insulation plates being inset into a rear-exterior wall of the core insert and one of the rear-wall insulation plates being inset into a rear-exterior wall of the cavity insert; at least two side-wall glass-filled polyimide insulation plates, one of the side-wall insulation plates being inset into a side-exterior wall of the core insert and one of the side-wall insulation plates being inset into a side-exterior wall of the cavity insert; the at least two rear-wall glass-filled polyimide insulation plates and the at least two side-wall glass-filled polyimide insulation plates being inset into each of their respective walls such that a substantially planer surface of each insulation plate is substantially flush with an exterior planar surface of the respective wall into which it is inset; the rear-wall and side-wall glass-filled polyimide insulation plates having the following physical properties: i) thermal conductivity of about 0.30 W/mk; ii) a coefficient of expansion (in length and width) of about $11 \times 10^{-6}$ 1/K; iii) a compressive strength of about 750 N/mm$^2$ at 23° C.; iv) a compressive strength of about 500 N/mm$^2$ at 200° C.; v) a bending strength of about 720 N/mm$^2$ at 23° C.; and vi) a density of about 2 g/cm$^3$; the rear-wall and side-wall glass-filled insulation plates having a thickness ranging from 3 to 5 millimeters; the cavity insert and core insert having a plurality of cooling holes, the cooling holes having a diameter ranging from 3 to 6 millimeters; a plurality of substantially cylindrical fluid-cooling channels that are respectively positioned within the cavity insert and core insert at a relative distance from a cavity-insert molding surface or a core-insert molding surface, wherein the relative distance for each fluid-cooling channel is substantially equal to the fluid-cooling channel's cross-sectional diameter, wherein the relative distance is also the shortest distance between a fluid-cooling channel's wall and a cavity-insert molding surface or a core-insert molding surface; and a temperature-sensing thermocouple that is located within the cavity insert or core insert in a position that is substantially adjacent to an estimated last volume of space to be filled by polymer-mold flow.

23 Claims, 9 Drawing Sheets

(56) References Cited

PUBLICATIONS

Screen captures from Single Temperature Controls, Inc. webpage and data sheet [online]; 6 pages; retrieved from the Internet: <www.Single-temp.com/>, accessed Feb. 2019.

POLYMER INJECTION-MOLDING MOLD AND RELATED METHODS

CROSS-REFERENCE TO RELATED APPLICATIONS

Not Applicable

BACKGROUND OF THE INVENTION

Polymer injection-molding methods are known, and there is a need for improvement.

BRIEF SUMMARY OF THE INVENTION

A polymer injection-molding mold having a polymer injection-molding mold having a core insert and a cavity insert; at least two rear-wall glass-filled polyimide insulation plates, one of the rear-wall insulation plates being inset into a rear-exterior wall of the core insert and one of the rear-wall insulation plates being inset into a rear-exterior wall of the cavity insert; at least two side-wall glass-filled polyimide insulation plates, one of the side-wall insulation plates being inset into a side-exterior wall of the core insert and one of the side-wall insulation plates being inset into a side-exterior wall of the cavity insert; the at least two rear-wall glass-filled polyimide insulation plates and the at least two side-wall glass-filled polyimide insulation plates being inset into each of their respective walls such that a substantially planer surface of each insulation plate is substantially flush with an exterior planar surface of the respective wall into which it is inset; the rear-wall and side-wall glass-filled polyimide insulation plates having the following physical properties: i) thermal conductivity of about 0.30 W/mk; ii) a coefficient of expansion (in length and width) of about $11 \times 10^{-6}$ 1/K; iii) a compressive strength of about 750 N/mm$^2$ at 23° C.; iv) a compressive strength of about 500 N/mm$^2$ at 200° C.; v) a bending strength of about 720 N/mm$^2$ at 23° C.; and vi) a density of about 2 g/cm$^3$; the rear-wall and side-wall glass-filled insulation plates having a thickness ranging from 3 to 5 millimeters; the cavity insert and core insert having a plurality of cooling holes, the cooling holes having a diameter ranging from 3 to 6 millimeters; a plurality of substantially cylindrical fluid-cooling channels that are respectively positioned within the cavity insert and core insert at a relative distance from a cavity-insert molding surface or a core-insert molding surface, wherein the relative distance for each fluid-cooling channel is substantially equal to the fluid-cooling channel's cross-sectional diameter, wherein the relative distance is also the shortest distance between a fluid-cooling channel's wall and a cavity-insert molding surface or a core-insert molding surface; and a temperature-sensing thermocouple that is located within the cavity insert or core insert in a position that is substantially adjacent to an estimated last volume of space to be filled by polymer-mold flow.

A polymer injection-molding mold having a polymer injection-molding mold having a core insert and a cavity insert; at least one rear-wall glass-filled polyimide insulation plate, the at least one rear-wall glass-filled polyimide insulation plate being inset into a rear-exterior wall of either the core insert or the cavity insert such that a substantially planer surface of the insulation plate is substantially flush with an exterior planar surface of the wall into which it is inset; the at least one rear-wall glass-filled polyimide insulation plate having the following physical properties: i) thermal conductivity of at least about 0.30 W/mk; ii) a coefficient of expansion (in length and width) of at least about $11 \times 10^{-6}$ 1/K; iii) a compressive strength of at least about 750 N/mm$^2$ at 23° C.; iv) a compressive strength of at least about 500 N/mm$^2$ at 200° C.; v) a bending strength of at least about 720 N/mm$^2$ at 23° C.; and vi) a density of about 2 g/cm$^3$; the at least one rear-wall glass-filled insulation plate having a thickness ranging from 3 to 5 millimeters; the cavity insert and core insert having a plurality of cooling holes, the cooling holes having a diameter ranging from 3 to 6 millimeters; a plurality of substantially cylindrical fluid-cooling channels that are respectively positioned within the cavity insert and core insert at a relative distance from a cavity-insert molding surface or a core-insert molding surface, wherein the relative distance for each fluid-cooling channel is substantially equal to the fluid-cooling channel's cross-sectional diameter, wherein the relative distance is also the shortest distance between a fluid-cooling channel's wall and a cavity-insert molding surface or a core-insert molding surface; and a temperature-sensing thermocouple that is located within the cavity insert or core insert in a position that is substantially adjacent to an estimated last volume of space to be filled by polymer-mold flow.

A method comprising the steps of performing polymer-injection molding using a mold that is insulated and has a substantially uniform temperature as molten polymer is injected into the mold; injecting molten polymer into the mold, wherein the molten polymer travels into the mold in a fluid-flow pattern that is not laminar; and using a fluid-based cooling system to cool the mold after the polymer has been injected into the mold.

DETAILED DESCRIPTION OF THE INVENTION

Figure 1:
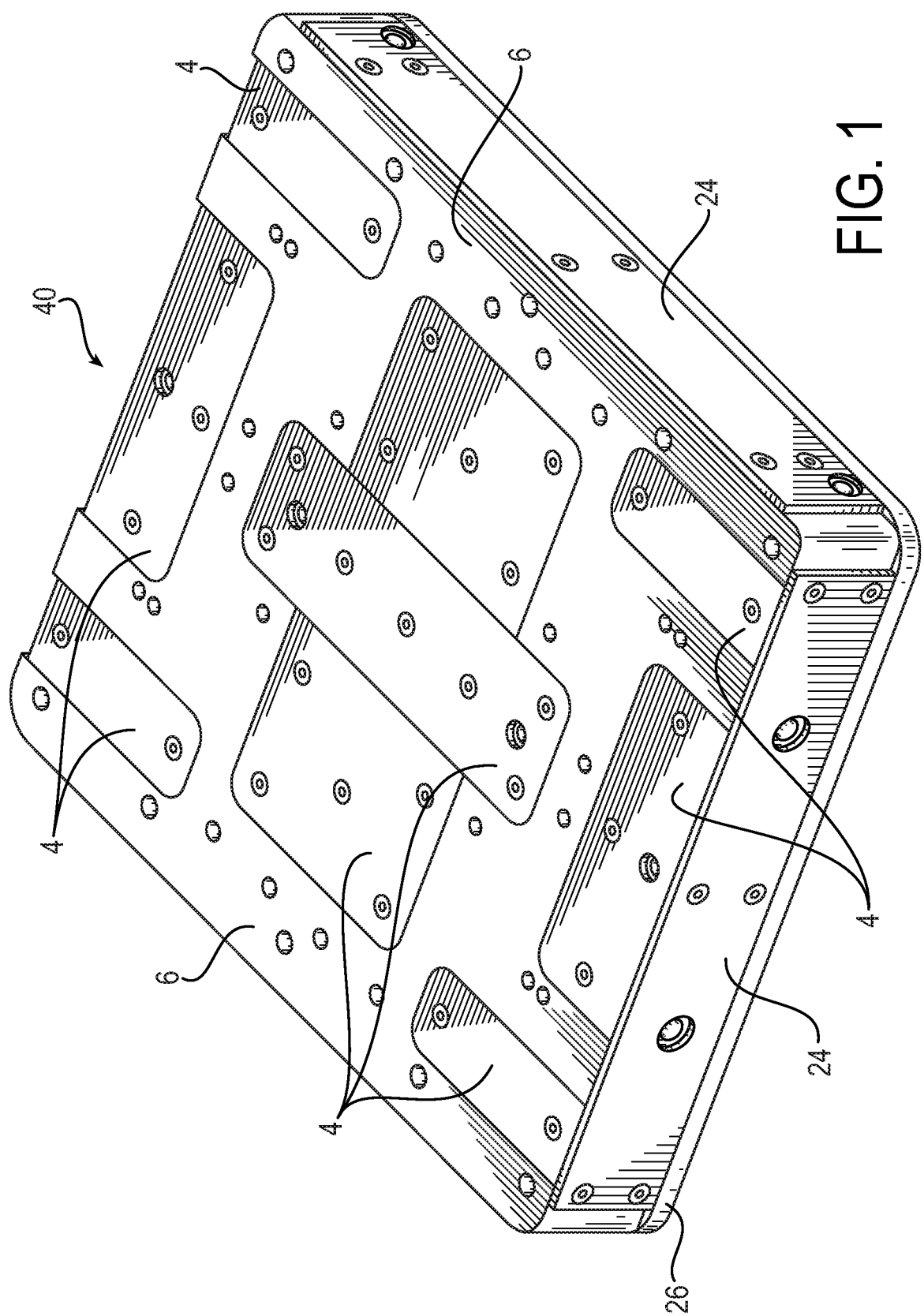
FIG. 1 is a rear perspective view of a mold-insert embodiment.

Embodiments are directed to a polymer injection-molding mold. Very generally, a polymer injection-molding mold is made up of an A side and B side, wherein each side is made up of a mold base and an insert. A mold base supports its adjacent insert, and the two inserts are commonly referred to as the core insert and the cavity insert. When fitted together during a molding process, the interior portions of the core insert and cavity insert describe a desired shape or volume of space that is to be filled with molten polymer.

As shown in the figures, each embodiment of polymer injection-molding mold 2 is at least in part made up of core insert 38 and cavity insert 40. Very generally, core insert 38 has a rear-exterior wall 6 and four side-exterior walls 26; similarly, cavity insert 40 has a rear-exterior wall 6 and four side-exterior walls 26. An insert rear-exterior wall, whether cavity or core, will be referred to herein as a rear-exterior wall 6, and an insert side-exterior wall, whether cavity or core, will be referred to as a side-exterior wall 26.

FIG. 1 shows an embodiment that is a perspective rear view of cavity insert 40. Cavity insert 40 is shown as having a plurality of first glass-filled polyimide insulation plates 4 inset into a rear-exterior wall 6; also shown is cavity insert 40 having two visible side-exterior walls 26 having second glass-filled polyimide insulation plates 24 respectively inset therein. Embodiments allow for first glass-filled polyimide insulation plates 4 and second glass-filled polyimide insulation plates 24 being inset into their respective rear and side walls 6 and 26 at a depth that causes an exposed exterior planar surface of each respective insulation plate to be substantially flush with the respective wall 6 or 26 into which it is inset. In alternate embodiments, first glass-filled polyimide insulation plates 4 and second glass-filled polyimide insulation plates 24 can be inset into their respective rear and side walls 6 and 26 at a depth that causes an exterior planar surface of each insulation plate to be either above or below a flush position relative to the exterior surface of the respective wall into which it is inset.

In embodiments, at least one first glass-filled polyimide insulation plate 4 is inset into a rear wall 6 such that an exterior planer surface of insulation plate 4 is substantially flush with an exterior planar surface of a rear wall 6 into which it is inset; and wherein at least one second glass-filled polyimide insulation plate 24 is inset into a side-exterior wall 26 such that a planer surface of the at least one second glass-filled polyimide insulation plate 24 is substantially flush with an exterior planar surface of side-exterior wall 26 into which it is inset.

In embodiments, useful glass-filled polyimide insulation plates 4 and 24 have a thickness ranging from 3 to 5 millimeters. In other embodiments, useful glass-filled polyimide insulation plates 4 and 24 have a thickness ranging from 2 to 6 millimeters. In still other embodiments, useful glass-filled polyimide insulation plates 4 and 24 have a thickness of 1, 2, 3, 4, 5, or 6 millimeters.

Based upon the characteristic dimensions of polymer injection-molding mold 2, length; width, and thickness dimensions of useful glass-filled polyimide insulation plates 4 and 24 can be determined by persons of ordinary skill in the art without having to exercise undue experimentation.

In embodiments, any number of glass-filled polyimide insulation plates, 4 and 24, can be used to insulate polymer injection-molding mold 2. In other embodiments, only glass-filled polyimide insulation plates, 4 and 24, having the following physical properties can be used:
 i) thermal conductivity of about 0.30 W/mk;
 ii) a coefficient of expansion (in length and width) of about $11 \times 10^{-6}$ 1/K;
 iii) a compressive strength of at least about 750 N/mm² at 23° C.;
 iv) a compressive strength of at least about 500 N/mm² at 200° C.;
 v) a bending strength of at least about 72.0 N/mm² at 23° C.; and
 vi) a density of about 2 g/cm³.

In still other embodiments, only glass-filled polyimide insulation plates, 4 and 24, having the following physical properties can be used:
 i) thermal conductivity of at least about 0.30 W/mk;
 ii) a coefficient of expansion (in length and width) of at least about $11 \times 10^{-6}$ 1/K;
 iii) a compressive strength of at least about 750 N/mm² at 23° C.;
 iv) a compressive strength of at least about 500 N/mm² at 200° C.;
 v) a bending strength of at least about 720 N/mm² at 23° C.; and
 vi) a density of about 2 g/cm³.

In embodiments for both core insert 38 and cavity insert 40, first glass-filled polyimide insulation plates 4 are inset into rear-exterior wall 6 and thereby cover surface-area portions of rear-exterior wall 6. Stated differently; surface area portions of rear-exterior wall 6 can be understood as being covered by insulation plates that are inset into rear-exterior wall 6. In embodiments, first glass-filled polyimide insulation plates 4 collectively cover at most 40% of rear-exterior wall 6 surface area. In other embodiments, first glass-filled polyimide insulation plates 4 collectively cover at most 35% of rear-exterior wall 6 surface area. In still other embodiments, first glass-filled polyimide insulation plates 4 collectively cover at most 30% of rear-exterior wall 6 surface area. In still other embodiments, first glass-filled polyimide insulation plates 4 collectively cover at most 20% of rear-exterior wall 6 surface area.

In embodiments, first glass-filled polyimide insulation plates 4 collectively cover at least 10% of rear-exterior wall 6 surface area. In other embodiments, first glass-filled polyimide insulation plates 4 collectively cover at least 20% of rear-exterior wall 6 surface area. In still other embodiments, first glass-filled polyimide insulation plates 4 collectively cover at least 30% of rear-exterior wall 6 surface area. In still other embodiments, first glass-filled polyimide insulation plates 4 collectively cover approximately 40% of rear-exterior wall 6 surface area.

Figure 2:
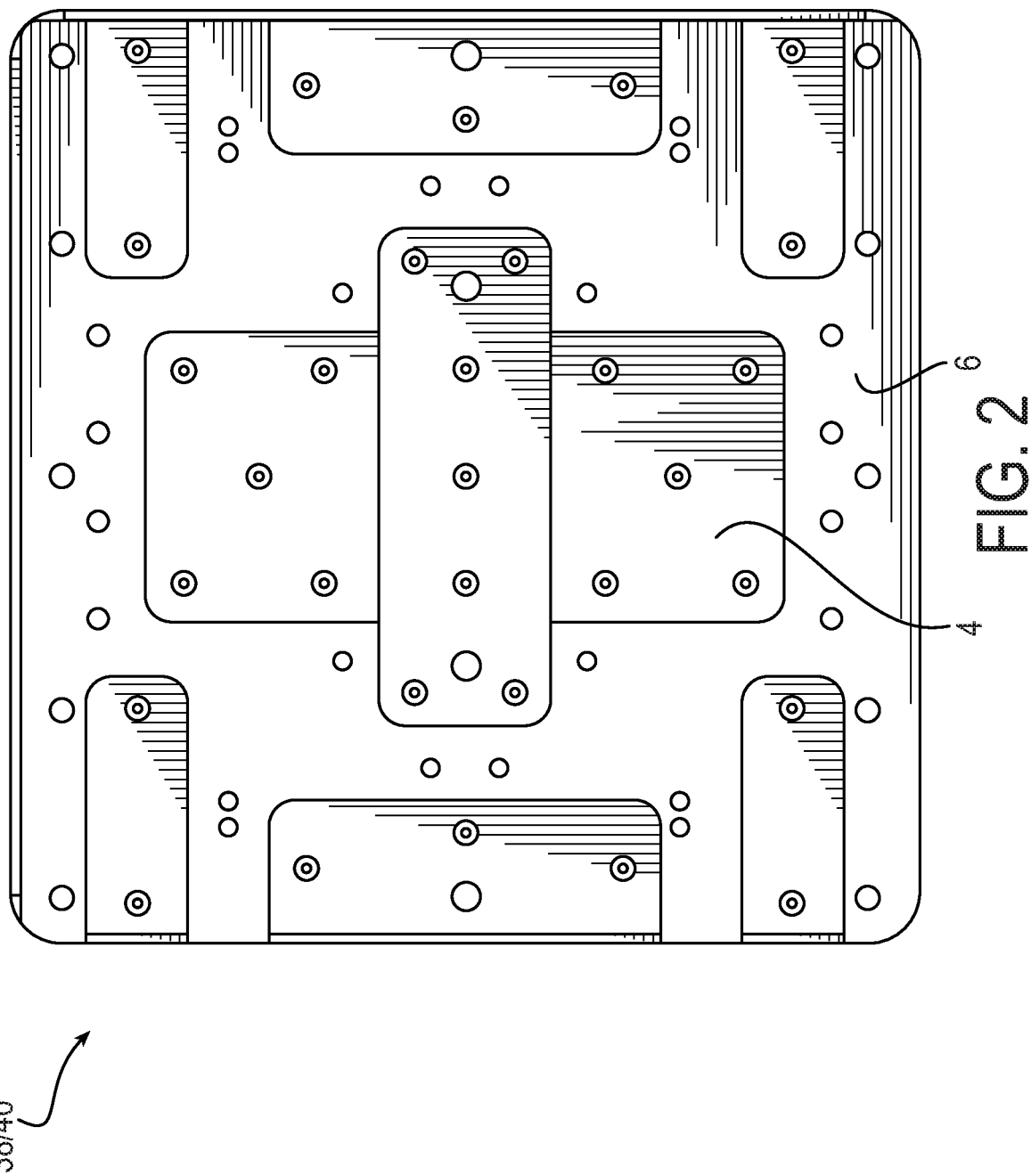
FIG. 2 is a rear view of a mold-insert embodiment.

FIG. 2 shows a rear view of an exterior-rear-wall embodiment that is useful for both: i) core-insert exterior-rear-wall embodiments, and ii) cavity-insert exterior-rear-wall embodiments. In the shown embodiment, rear-exterior wall 6 has a plurality of first glass-filled polyimide insulation plates 4 that are inset flush therein.

Figure 3C:
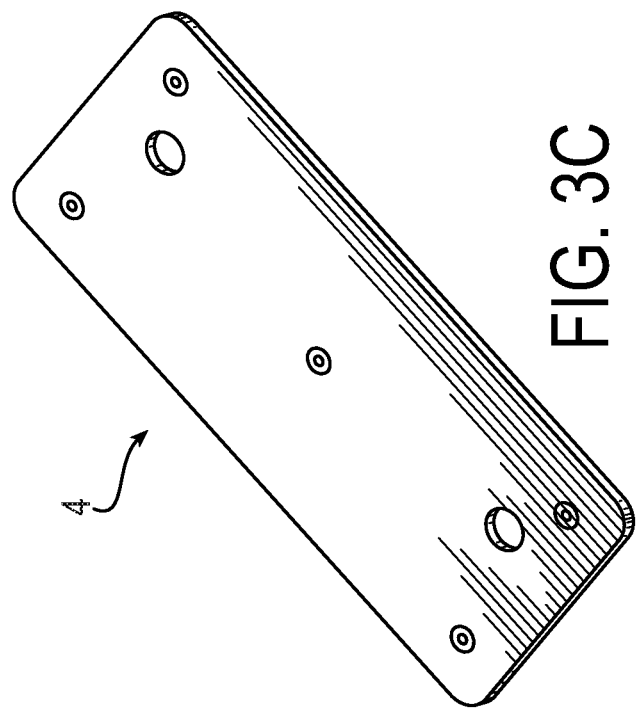
FIG. 3C is a perspective view of a glass-filled insulation plate.
Figure 3B:
FIG. 3B is a side view of a glass-filled insulation plate.
Figure 3A:
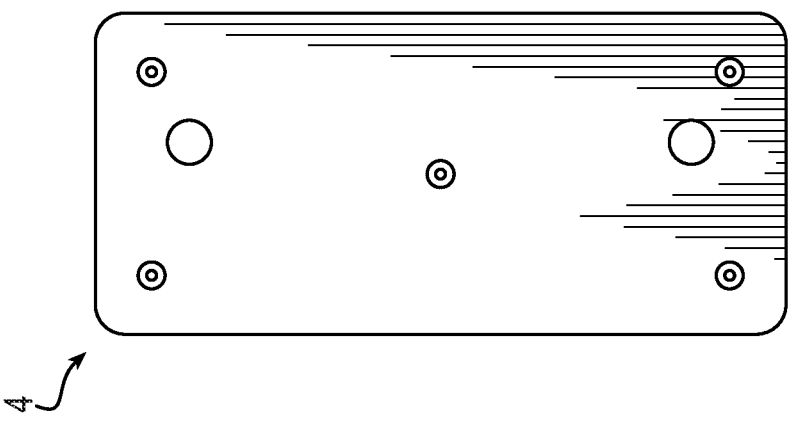
FIG. 3A is a top view of a glass-filled insulation plate.

Useful glass-filled polyimide insulation plates are commercially available, and FIGS. 3A, 3B, and 3C respectively show a top, side, and perspective view of a useful first glass-filled polyimide insulation plate 4. Useful glass-filled polyimide insulation plates can be acquired from a German manufacturer and distributor called Isocos.

Figure 4:
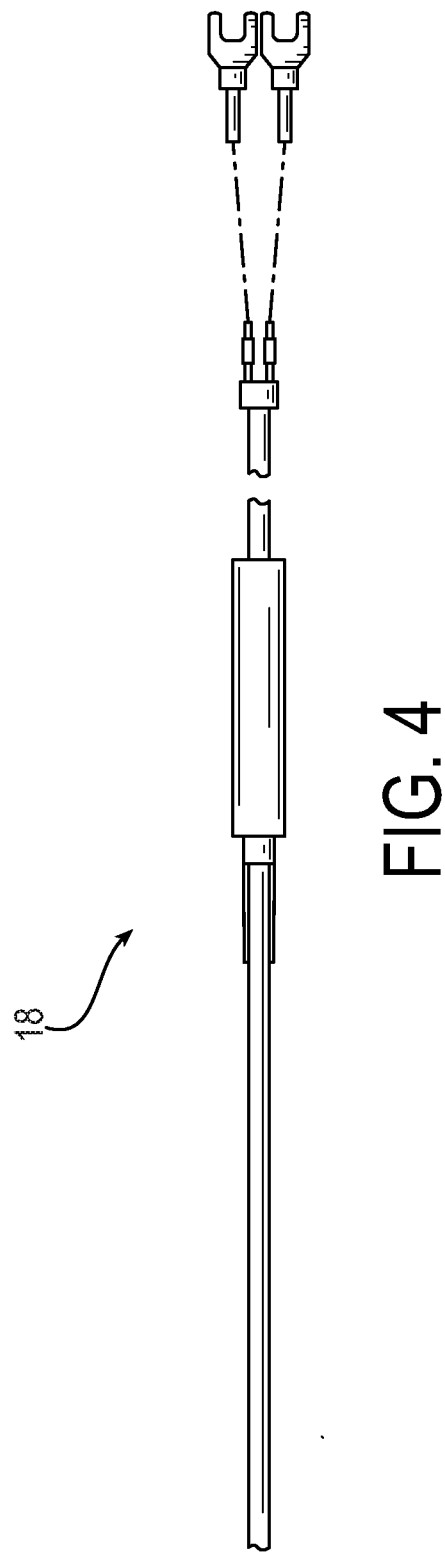
FIG. 4 is an exploded side view of a thermocouple.

FIG. 4 shows a side view of temperature-sensing thermocouple 18 that can be used as a temperature-sensing component within polymer injection-molding mold 2. In embodiments, temperature-sensing thermocouple 18 is positioned within polymer injection-molding mold 2 at approximately an estimated last volume of space to be filled by polymer-mold flow. In embodiments, and more specifically, temperature-sensing thermocouple 18 is positioned within either cavity insert 40 or core insert 38. An estimated last volume of space to be filled can be understood as the last portion or volume within the mold cavity to receive molten polymer mold flow from a shot of molten polymer during a molding process, and an estimated last volume of space to be filled within a mold cavity can be determined by a person of ordinary skill in the art without having to exercise undue experimentation. In embodiments, the estimated last volume of space to be filled by polymer-mold flow is approximately equal to the last predicted weld line to fill or the last predicted weld line to come into contact with polymer mold flow during an injection-molding process. The last predicted weld line to fill can be understood as the last weld line within the mold cavity to receive molten polymer mold flow from a shot of molten polymer during an injection-molding process. Injection-molding weld lines are well known, and the weld line that will be the last to fill within polymer injection-molding mold 2 can be determined by a person of ordinary skill in the art without having to exercise undue experimentation.

Figure 5:
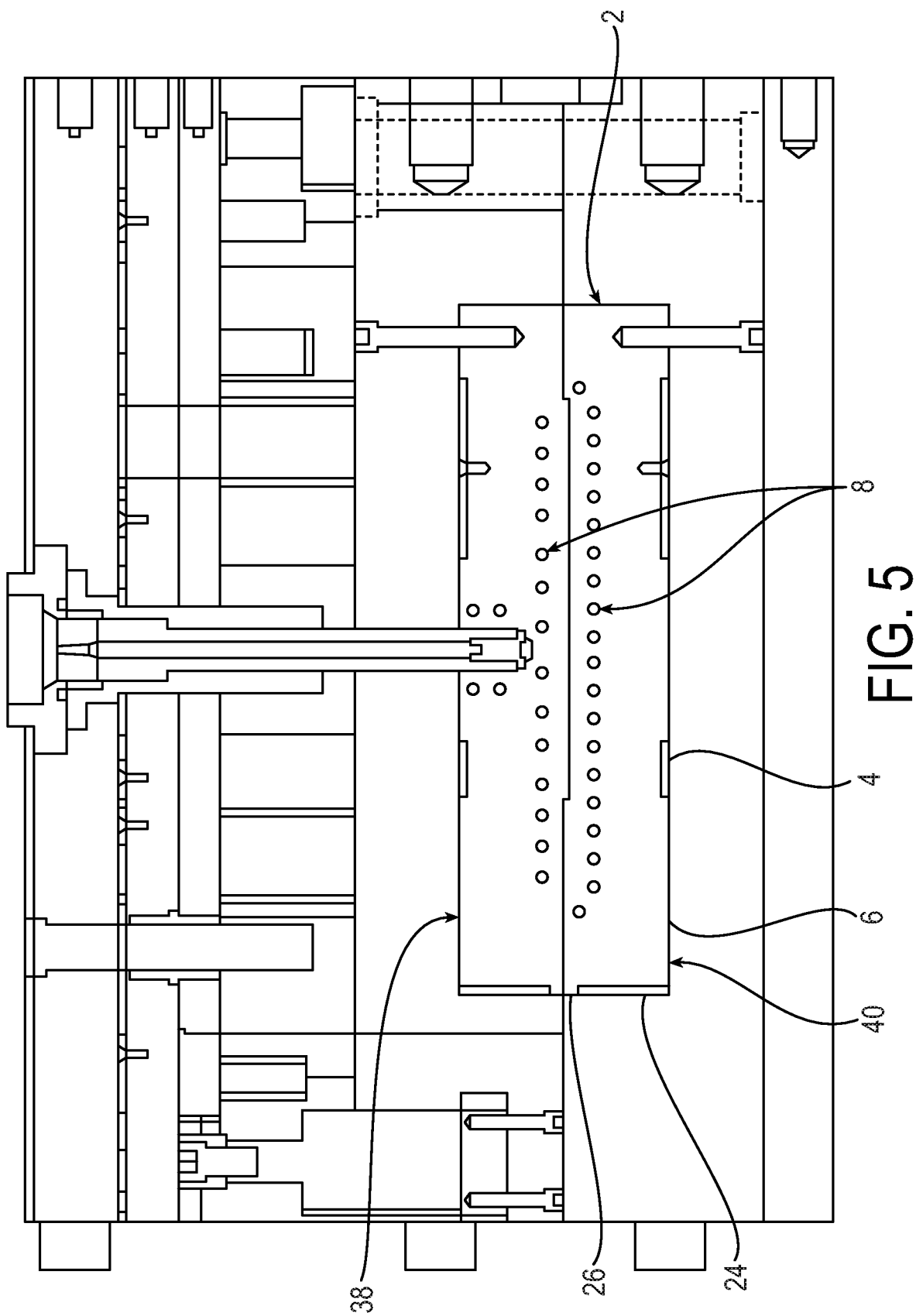
FIG. 5 is a two-dimensional schematic of an injection-molding mechanical embodiment.

FIG. 5 shows a two-dimensional view of an embodiment having polymer injection-molding mold 2 within an injection-molding-apparatus setting. Shown are a plurality of first glass-filled polyimide insulation plates 4 that are inset flush into the respective rear walls 6 of both core insert 38 and cavity insert 40. Also shown are a plurality of second glass-filled polyimide insulation plates 24 positioned on side-exterior walls 26 of both core insert 38 and cavity insert 40. A plurality of cooling holes 8 are also shown on side-exterior walls 26 of both core insert 38 and cavity insert 40. In FIG. 5, the diameters of cooling holes 8 aren't necessarily drawn to scale.

Cooling holes 8 are well known and can be positioned on an exterior surface of polymer injection-molding mold 2 as determined by a person of ordinary skill in the art without having to exercise undue experimentation. In embodiments, cooling holes 8 are positioned on an exterior surface of cavity insert 40 and core insert 38. Cooling holes are the orifices that allow cooling fluid, such as chilled water, to enter or exit polymer injection-molding mold 2. In embodiments, and as shown in FIG. 5, cooling holes 8 are positioned on side-exterior walls 26 of both core insert 38 and cavity insert 40. The diameter of cooling holes 8 can range from 3 to 6 millimeters; in embodiments, the diameter of cooling holes 8 can range from 4 to 5 millimeters. The diameter of cooling holes 8 can be understood as the diameter of the orifice through which cooling fluid travels in or out of polymer injection-molding mold 2.

Figure 6:
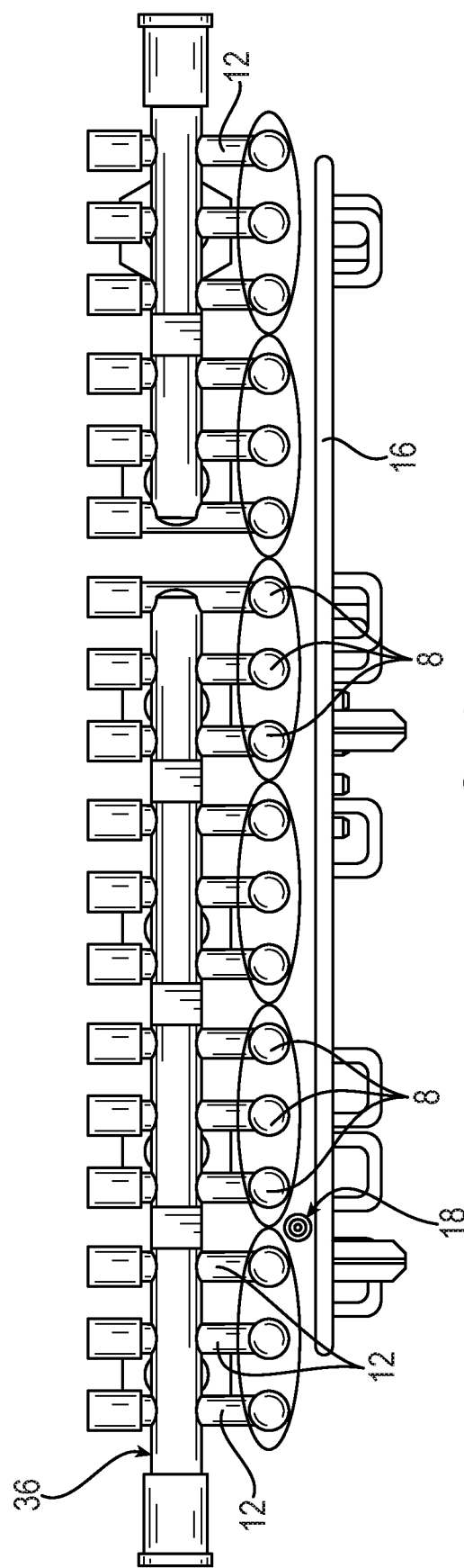
FIG. 6 is a side cross-sectional view of an arrangement of fluid-cooling channels within an insert.

FIG. 6 shows a schematic embodiment of cavity-cooling components as they would be present within polymer injection-molding mold 2. Cooling holes 8 are located on the end portions of internal cooling-fluid manifold 36. Substantially cylindrical fluid-cooling channels 12 stem off from internal cooling-fluid manifold 36 and in embodiments are relatively spaced apart from adjacent fluid-cooling channels 12 at a distance of approximately 8 millimeters. In embodiments, substantially cylindrical fluid-cooling channels 12 are relatively spaced apart from adjacent channels 12 at a distance of approximately 6 to 10 millimeters. In still other embodiments, substantially cylindrical fluid-cooling channels 12 are relatively spaced apart from adjacent channels 12 at a distance of approximately 6, 7, 8, 9, or 10 millimeters. In still other embodiments, substantially cylindrical fluid-cooling channels 12 are relatively spaced apart from adjacent channels 12 at distances that can vary between different pairs of adjacent channels 12; in embodiments, the distance between a first pair of adjacent channels 12 can be a distance that is different from that of a second pair of adjacent channels 12; and in any embodiment the distance between any pair of adjacent channels 12 is approximately 6, 7, 8, 9, or 10 millimeters.

In the embodiment shown in FIG. 6, substantially cylindrical fluid-cooling channels 12 are positioned approximately 6 millimeters from inner-cavity mold wall 16. In other embodiments, substantially cylindrical fluid-cooling channels 12 are positioned 5 to 7 millimeters from inner-cavity mold wall 16. In still other embodiments, substantially cylindrical fluid-cooling channels 12 are positioned a distance from inner-cavity mold wall 16, wherein the distance for each respective fluid-cooling channel 12 is equal to the fluid-cooling channel's cross-sectional diameter plus or minus 20%. In still other embodiments, substantially cylindrical fluid-cooling channels 12 are positioned a distance from inner-cavity mold wall 16, wherein the distance for each respective fluid-cooling channel 12 is equal to the fluid-cooling channel's cross-sectional diameter plus or minus 10%. In still other embodiments, substantially cylindrical fluid-cooling channels 12 are positioned a distance from inner-cavity mold wall 16, wherein the distance for each respective fluid-cooling channel 12 is substantially equal to the fluid-cooling channel's cross-sectional diameter. The above-described distance between a substantially cylindrical fluid-cooling channel 12 and inner-cavity mold wall 16 is equal to the shortest distance between a fluid-cooling channel's wall and an inner-cavity surface; stated differently, the above-described distance is equal to the distance between one or more points on a fluid-cooling channel's 12 wall that is closest to inner-cavity mold wall 16.

Figure 7:
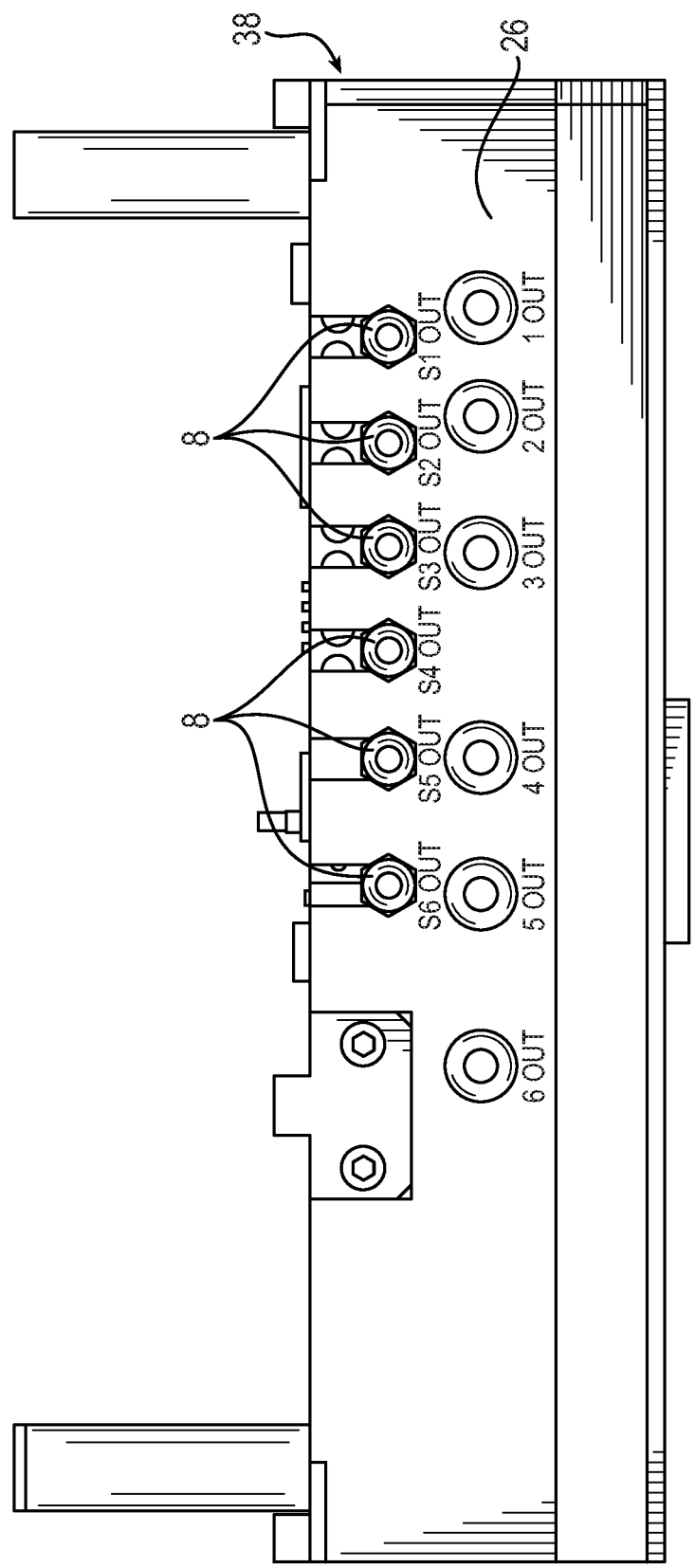
FIG. 7 is a side view of an embodiment that includes a core insert.

FIG. 7 is a side view of core insert 38 that has a plurality of cooling holes 8 respectively positioned on exterior side-wall 26.

Figure 8:
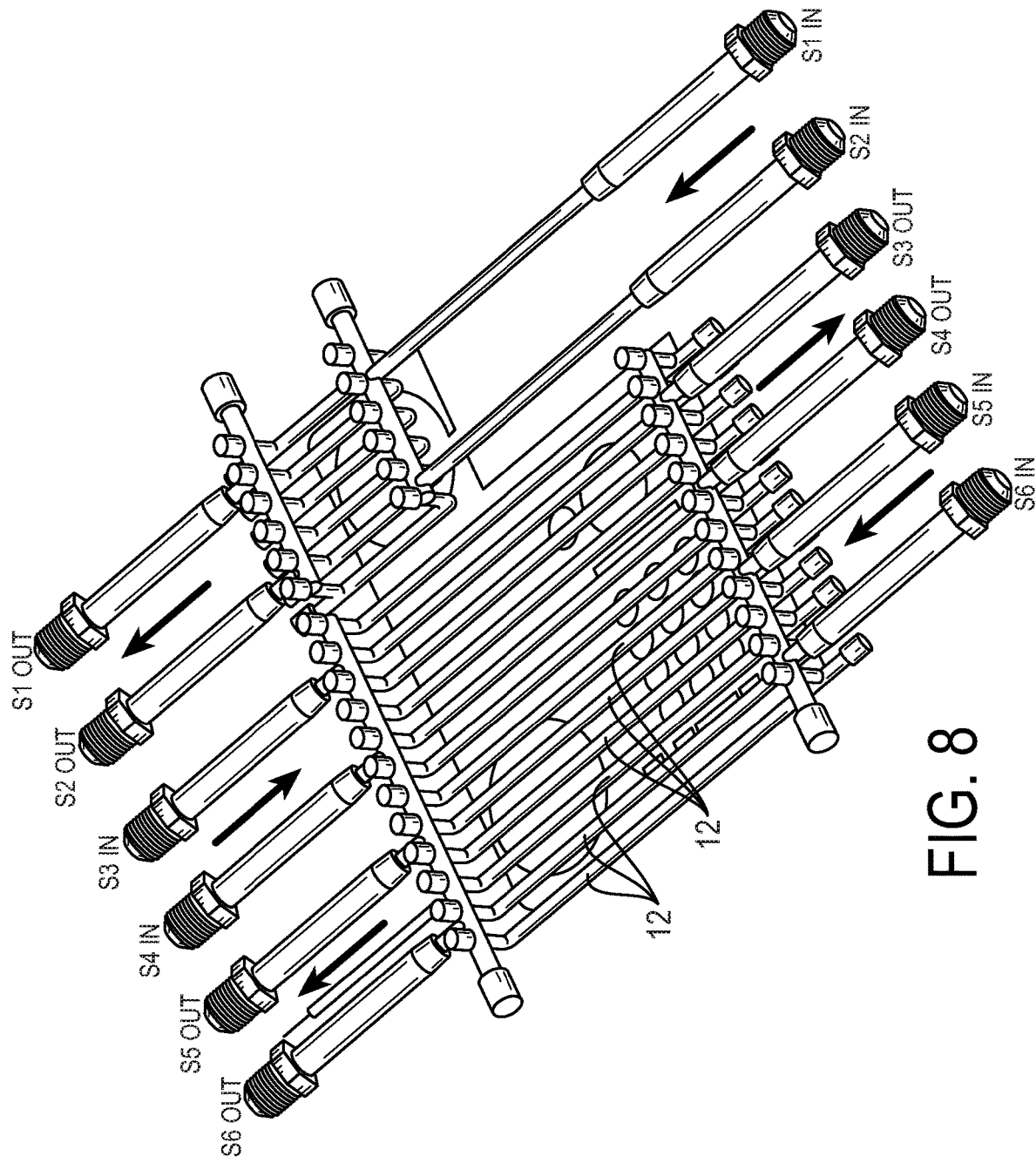
FIG. 8 is a perspective view of a zonal cooling schematic.

FIG. 8 is a perspective view of a zonal cooling schematic that shows an embodiment of fluid-cooling channels 12 arranged in a useful configuration that would be positioned within core insert 38 or cavity insert 40. For each of the respective fluid-cooling channels 12, the tubular exterior walls of each fluid-cooling channel 12 are shown.

Figure 9:
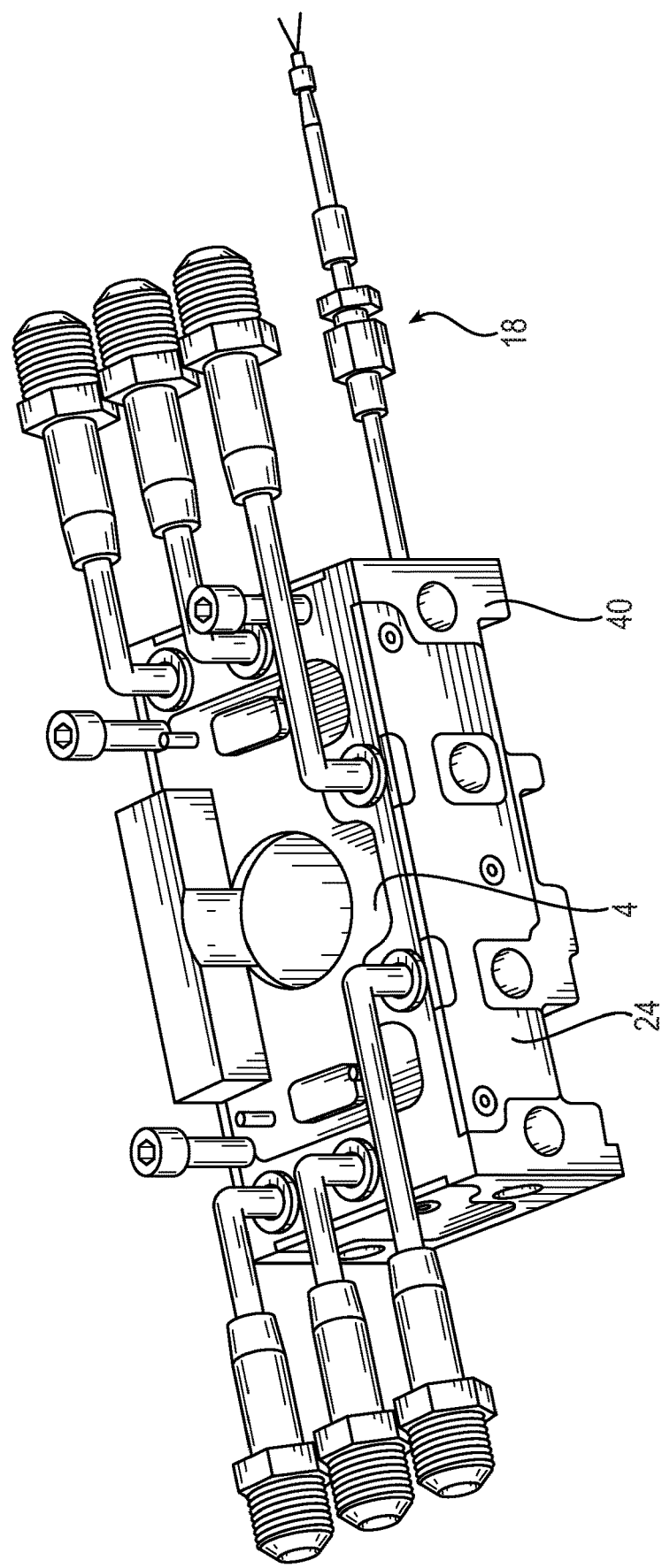
FIG. 9 is a perspective view of an embodiment that includes insulation plates.

FIG. 9 is a top-rear perspective view of an embodiment of cavity insert 40 having insulation plates 4 and 24 and thermocouple 18.

Additional compositional embodiments are directed to a polymer injection-molding mold having at least one glass-filled insulation plate and at least one non-glass-filled insulation plate; in other words, a combination of both. In these embodiments, the insulation plates can be positioned on either of the inserts as described in any of the above compositional embodiments or as the insulation-plate positions are shown in the figures. As a non-limiting example of useful insulation-plate positions, any combination of glass and non-glass-filled insulation plates are positioned flush into the insert rear-exterior walls 6 and side-exterior walls 26.

Still other compositional embodiments are directed to a polymer injection-molding mold having only insulation plates that are non-glass-filled, i.e., no glass-filled insulation plates are employed. In these embodiments, which employ only non-glass filled insulation plates, the insulation plates can be positioned on either of the inserts as described in any of the above compositional embodiments or as insulation-plate positions are shown in the figures. As a non-limiting example, any combination of insulation plates are positioned flush into insert rear-exterior walls 6 and side-exterior walls 26.

Useful non-glass-filled insulation plates are commercially available and any known insulation plate used in polymer injection-molding methods or compositions can be employed.

In still other embodiments, additional insulating elements are part of the injection-molding mold composition. These additional insulating elements can be used in combination with the above-described insulation embodiments. These insulation elements are known and commonly used in polymer-injection-molding molds, applications, and methods. Non-limiting examples of these insulation elements include: a) insulation plates: glass-filled, non-glass-filled, or a combination thereof, on all exterior sides of the injection mold, and b) adding insulation plates, e.g., glass-filled, non-glass-filled, or a combination thereof; to the clamping plates of the injection mold in order to insulate the clamping plates from the molding-machine front and rear platens.

Any of the above polymer-injection-molding-mold embodiments can be used in known polymer-injection-molding methods by persons of ordinary skill in the art without having to exercise undue experimentation. In many instances, the polymer-injection-molding-mold embodiments, and particularly the insulated-insert embodiments, are drop-in replacements for known polymer injection-molding molds. Furthermore, the above polymer-injection-molding-mold embodiments can be used in known polymer injection-molding machines using known methods.

Additional embodiments are directed to a polymer injection-molding method that injects molten polymer into the mold in a way that results in the molten polymer traveling in a non-laminar fluid-flow pattern during the step of polymer injection. In other words, during injection, the molten polymer shot travels into the mold in a fluid-flow pattern that is not laminar; it is a non-laminar fluid-flow pattern. A non-laminar fluid-flow pattern can at least be achieved by performing polymer-injection molding using any of the above polymer-injection-mold composition embodiments that use only glass-filled insulation plates; a non-laminar fluid-flow pattern can also be achieved in embodiments that use a combination of glass-filled and non-glass-filled insulation plates. In still other embodiments, a non-laminar fluid-flow pattern can be achieved in embodiments that use a combination of: glass-filled insulation plates, non-glass-filled insulation plates, and insulation elements. At least one reason why a non-laminar fluid flow pattern is achieved during polymer injection is the substantially uniform temperature throughout the mold and its inserts—including the mold-insert surfaces that the polymer comes into contact with during the molten-polymer injection step. The above polymer-injection-molding-mold embodiments have insulation arrangements that allow the inserts to have a substantially uniform temperature that results in the molten polymer traveling into the insert and mold cavity in a non-laminar fluid-flow pattern.

In embodiments, a substantially uniform temperature throughout the mold, including its inserts, in combination with a cooling system that accelerates cooling of the already-injected polymer within the mold, allows for a production method that produces workability and efficiency. A useful cooling system has been generally described above and in the figures. In embodiments, the cooling system can be used with chilled or non-chilled water.

What is claimed is:

1. A polymer injection-molding mold comprising:
   a polymer injection-molding mold having a core insert and a cavity insert;
   at least two rear-wall glass-filled polyimide insulation plates, one of the rear-wall insulation plates being inset substantially flush into a rear-exterior wall of the core insert and one of the rear-wall insulation plates being inset substantially flush into a rear-exterior wall of the cavity insert;
   at least two side-wall glass-filled polyimide insulation plates, one of the side-wall insulation plates being inset substantially flush into a side-exterior wall of the core insert and one of the side-wall insulation plates being inset substantially flush into a side-exterior wall of the cavity insert;
   the rear-wall and side-wall glass-filled polyimide insulation plates having the following physical properties:
   i) thermal conductivity of about 0.30 W/mk;
   ii) a coefficient of expansion (in length and width) of about $11 \times 10^{-6}$ $^1$/K;
   iii) a compressive strength of about 750 N/mm$^2$ at 23° C.;
   iv) a compressive strength of about 500 N/mm$^2$ at 200° C.;
   v) a bending strength of about 720 N/mm$^2$ at 23° C.; and
   vi) a density of about 2 g/cm$^3$;
   the rear-wall and side-wall glass-filled insulation plates having a thickness ranging from 3 to 5 millimeters;
   the cavity insert and core insert having a plurality of cooling-channel outlets, the cooling-channel outlets having a diameter ranging from 3 to 6 millimeters;
   a plurality of substantially cylindrical fluid-cooling channels that are respectively positioned within the cavity insert and core insert at a relative distance from a cavity-insert molding surface or a core-insert molding surface, wherein the relative distance for each fluid-cooling channel is substantially equal to the fluid-cooling channel's cross-sectional diameter, wherein the relative distance is also the shortest distance between a fluid-cooling channel's wall and a cavity-insert molding surface or a core-insert molding surface; and
   a temperature-sensing thermocouple that is located within the cavity insert or core insert in a position that is substantially adjacent to an estimated last volume of space to be filled by polymer-mold flow.

2. The polymer-injection molding mold of claim 1, wherein the estimated last volume of space to be filled by polymer-mold flow is defined by the last weld line to receive polymer-mold flow.

3. The polymer-injection molding mold of claim 1, wherein at least one first glass-filled polyimide insulation plate is inset into a rear-exterior wall of the core insert and thereby collectively covers at least 20% of core-insert rear-exterior wall surface area.

4. The polymer-injection molding mold of claim 1, wherein at least one first glass-filled polyimide insulation plate is inset into a rear-exterior wall of the core insert and thereby collectively covers at least 30% of core-insert rear-exterior wall surface area.

5. The polymer-injection molding mold of claim 1, wherein at least one first glass-filled polyimide insulation plate is inset into a rear-exterior wall of the core insert and thereby collectively covers approximately 40% of core-insert rear-exterior wall surface area.

6. The polymer-injection molding mold of claim 1, wherein at least one first glass-filled polyimide insulation plate is inset into a rear-exterior wall of the core insert and thereby collectively covers at most 40% of core-insert rear-exterior wall surface area.

7. The polymer-injection molding mold of claim 1, wherein at least one first glass-filled polyimide insulation plate is inset into a rear-exterior wall of the core insert and thereby collectively covers at most 30% of core-insert rear-exterior wall surface area.

8. The polymer-injection molding mold of claim 1, wherein at least one first glass-filled polyimide insulation plate is inset into a rear-exterior wall of the core insert and thereby collectively covers at most 20% of core-insert rear-exterior wall surface area.

9. The polymer-injection molding mold of claim 1, wherein at least one first glass-filled polyimide insulation plate is inset into a rear-exterior wall of the cavity insert and thereby collectively covers at least 20% of cavity-insert rear-exterior wall surface area.

10. The polymer-injection molding mold of claim 1, wherein at least one first glass-filled polyimide insulation plate is inset into a rear-exterior wall of the cavity insert and thereby collectively covers at least 30% of cavity-insert rear-exterior wall surface area.

11. The polymer-injection molding mold of claim 1, wherein at least one first glass-filled polyimide insulation plate is inset into a rear-exterior wall of the cavity insert and thereby collectively covers approximately 40% of cavity-insert rear-exterior wall surface area.

12. The polymer-injection molding mold of claim 1, wherein at least one first glass-filled polyimide insulation plate is inset into a rear-exterior wall of the cavity insert and thereby collectively covers at most 40% of cavity-insert rear-exterior wall surface area.

13. The polymer-injection molding mold of claim 1, wherein at least one first glass-filled polyimide insulation plate is inset into a rear-exterior wall of the cavity insert and thereby collectively covers at most 30% of cavity-insert rear-exterior wall surface area.

14. The polymer-injection molding mold of claim 1, wherein at least one first glass-filled polyimide insulation plate is inset into a rear-exterior wall of the cavity insert and thereby collectively covers at most 20% of cavity-insert rear-exterior wall surface area.

15. A polymer injection-molding mold comprising:
   a polymer injection-molding mold having a core insert and a cavity insert;
   at least one rear-wall glass-filled polyimide insulation plate, the at least one rear-wall glass-filled polyimide insulation plate being inset substantially flush into a rear-exterior wall of either the core insert or the cavity insert;
   the at least one rear-wall glass-filled polyimide insulation plate having the following physical properties:
      i) thermal conductivity of at least about 0.30 W/mk;
      ii) a coefficient of expansion (in length and width) of at least about $11 \times 10^{-6}$ 1/K;
      iii) a compressive strength of at least about 750 N/mm² at 23° C.;
      iv) a compressive strength of at least about 500 N/mm² at 200° C.;
      v) a bending strength of at least about 720 N/mm² at 23° C.; and
      vi) a density of about 2 g/cm³;
   the at least one rear-wall glass-filled insulation plate having a thickness ranging from 3 to 5 millimeters;
   the cavity insert and core insert having a plurality of cooling-channel outlets, the cooling-channel outlets having a diameter ranging from 3 to 6 millimeters;
   a plurality of substantially cylindrical fluid-cooling channels that are respectively positioned within the cavity insert and core insert at a relative distance from a cavity-insert molding surface or a core-insert molding surface, wherein the relative distance for each fluid-cooling channel is substantially equal to the fluid-cooling channel's cross-sectional diameter, wherein the relative distance is also the shortest distance between a fluid-cooling channel's wall and a cavity-insert molding surface or a core-insert molding surface; and
   a temperature-sensing thermocouple that is located within the cavity insert or core insert in a position that is substantially adjacent to an estimated last volume of space to be filled by polymer-mold flow.

16. The polymer-injection molding mold of claim 15, wherein the estimated last volume of space to be filled by polymer-mold flow is defined by the last weld line to receive polymer-mold flow.

17. The polymer-injection molding mold of claim 15, wherein at least one first glass-filled polyimide insulation plate is inset into a rear-exterior wall of either the core insert or the cavity insert and thereby collectively covers at least 20% of the rear-exterior wall surface area.

18. The polymer-injection molding mold of claim 15, wherein at least one first glass-filled polyimide insulation plate is inset into a rear-exterior wall of either the core insert or the cavity insert and thereby collectively covers at least 30% of the rear-exterior wall surface area.

19. The polymer-injection molding mold of claim 15, wherein at least one first glass-filled polyimide insulation plate is inset into a rear-exterior wall of either the core insert or the cavity insert and thereby collectively covers at least 40% of the rear-exterior wall surface area.

20. The polymer-injection molding mold of claim 15, wherein at least one first glass-filled polyimide insulation plate is inset into a rear-exterior wall of either the core insert or the cavity insert and thereby collectively covers at most 40% of the rear-exterior wall surface area.

21. The polymer-injection molding mold of claim 15, wherein at least one first glass-filled polyimide insulation plate is inset into a rear-exterior wall of either the core insert or the cavity insert and thereby collectively covers at most 30% of the rear-exterior wall surface area.

22. The polymer-injection molding mold of claim 15, wherein at least one first glass-filled polyimide insulation plate is inset into a rear-exterior wall of either the core insert or the cavity insert and thereby collectively covers at most 20% of the rear-exterior wall surface area.

23. A method comprising the step of:
   using the polymer-injection molding mold of claim 15 in a polymer-injection-molding process.

* * * * *